July 22, 1941.    N. C. PRICE    2,250,035
SERVO CONTROL
Filed June 6, 1939
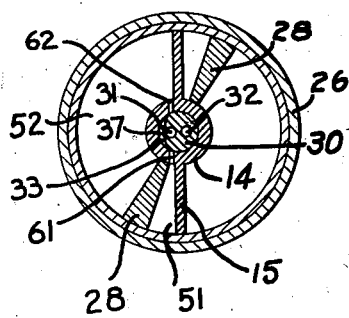
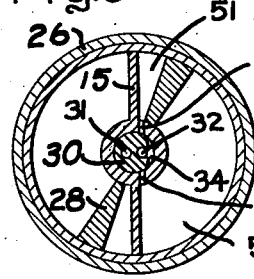
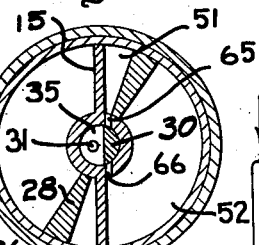
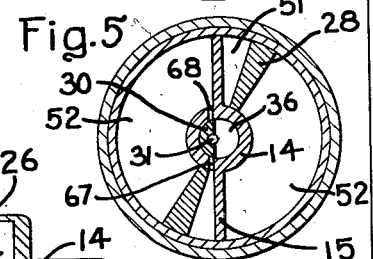
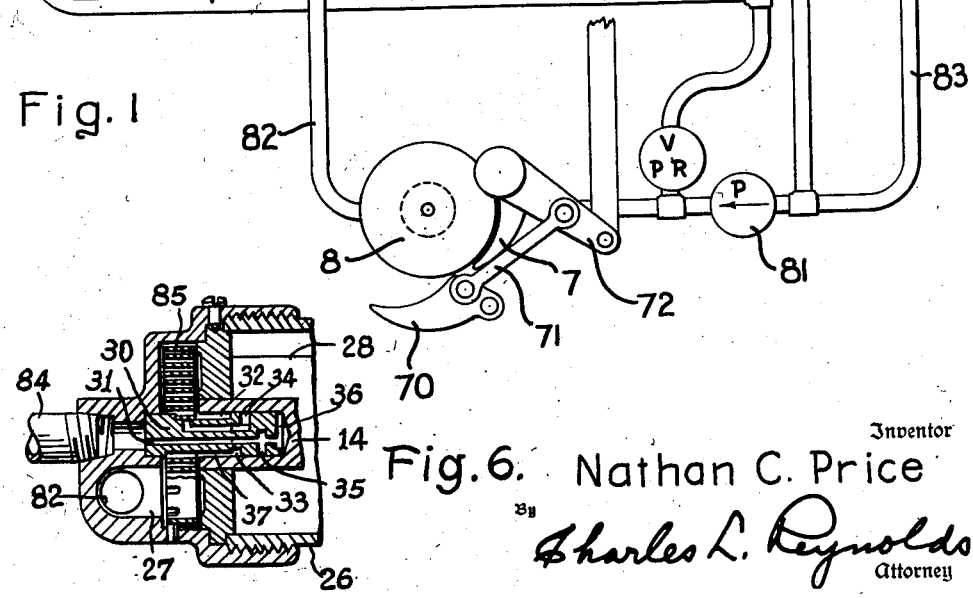
Inventor
Nathan C. Price
By Charles L. Reynolds
Attorney Patented July 22, 1941

2,250,035

UNITED STATES PATENT OFFICE 2,250,035

SERVO CONTROL

Nathan C. Price, Seattle, Wash., assignor, by mesne assignments, to Boeing Aircraft Company, Seattle, Wash., a corporation of Washington Application June 6, 1939, Serial No. 277,661

4 Claims. (Cl. 121—41)

The present invention contemplates a servo control whereby a weak force, when brought into play by movement of a controlling element, entrains movement of a controlled element by a strong force, which servo control will be self-adjusting into any one of an infinite number of positions of equilibrium throughout its range of movement. In this manner the position of the controlled element at any time will be governed by the position or setting of the controlling element, whereby movement of the controlled element will follow directly movement of the controlling element, yet without any positive connection between them, and merely by the interposition of the servo device to increase the power applicable to effect movement of the controlled device.

The control of devices aboard aircraft, under the influence of weak forces generated in controlling elements such as light thermostats or pressure-sensitive devices, by mechanism not susceptible to the influence of vibrations or other temporary or transitory effects, and which mechanism yet will be light and thoroughly reliable, is one of the principal objectives of my invention. Such servo devices have found application, for instance, in the control of the valve mechanism of devices for determining, controlling, and limiting the pressure or pressure differential within a supercharged aircraft cabin, in which instance the controlling element is a pressure-sensitive device of some sort. Such an arrangement is shown, for instance, in my copending application Serial No. 216,028, filed July 19, 1937, and in my Patent No. 2,208,554, issued July 16, 1940, respectively. The invention has also been found useful in thermostatically controlling the circulation of a heated fluid, intended for heating a galley aboard an aircraft. Such an arrangement is shown, for instance, in my Patent No. 2,193,142, issued March 12, 1940.

It is an object of the invention to provide a servo device of the general nature indicated which may be susceptible of control by various physical characteristics, and which may be employed to effect control movement of various types of devices, and which is at the same time capable of accomplishing the objectives indicated above.

In a special form it is an object of the invention to provide a servo device of this type the movable member whereof (e. g., a piston) is connected to the controlled element and is normally urged in one direction by yieldable means, such as a spring, and which is caused to move in the opposite direction by a fluid pressure medium, the force of the fluid pressure medium and that of the spring being normally held in equilibrium by reason of escape of the pressure fluid past the piston and out a vent, movable with the piston, the opening of which vent is controlled by a vent closure means which is movable under the influence of the controlling element, whereby the controlled element, connected to the piston, is moved in one direction by the yieldable means, and in the opposite direction by the pressure fluid medium acting upon the piston.

These objects, and others which will appear hereafter, will be better understood from a study of the accompanying drawings, of this specification, and of the claims which terminate the same.

In the accompanying drawings I have shown my invention embodied in certain representative forms, and in connection with typical controlling and controlled devices, it being understood that the form, character and arrangement of parts may be varied without departure from the principles of my invention as hereinafter defined.

Figure 1 is a view, including a diagram, of a fluid circulating system for supplying a heat transfer fluid from a source of heat to a heat utilizing device, such as the galley of an aircraft. This illustrates such a servo device operable under control of thermostatic means.

Figures 2, 3, 4 and 5 are transverse sections through the servo device on the respective lines 2—2, 3—3, 4—4, and 5—5, respectively, of Figure 1.

Figure 6 is an axial section of the servo device, the plane of section being at right angles to that of Figure 1.

While the details of the systems in which such servo devices are connected are not of large importance, it will assist in understanding the invention and the manner in which it operates if the nature of these devices be explained briefly and generally.

The system illustrated in Figure 1 includes a boiler 8, exposed to hot gases, to which fluid under pressure is supplied from a tank 80 by means of a pump 81, the fluid being delivered by a pressure line 82 to some heat-utilizing device (not shown, but as explained in Patent No. 2,193,142, for instance), and returning to the tank by way of the return line 83. The temperature of the boiler, hence of the fluid, is controlled by a vane 7, directing more or less hot gas over the boiler, and by a vane 70 which directs less or more cold air over the boiler; the two vanes are operated in unison, but oppositely, by a connecting link 71 and an arm 72, to which connects a link 76.

The chamber 26 is open, through a passage 27 in its head, to pressure fluid passing through the conduit 82, by way of certain ports which will be described in detail hereafter. The thermostat 85 is arranged as a spiral ribbon within an enlargement or chamber of the supply passage, which is in communication with the chamber 27 and the fluid passing therethrough. One end of the spiral ribbon 85 is in effect anchored to the casing 26, and the other end is connected to a rotatable *em 30, which functions as a vent closure.

Internally the chamber 26 is provided with two fixed abutments 28, and a cylindrical, axially hollow hub 14 carries two radial vanes 15 which constitute oscillatable pistons, and which divide the chambers defined by the fixed abutments 28 into two compartments, which compartments are designated 51 and 52.

The hub 14 is provided at each of four different axially spaced planes, represented by Figures 2, 3, 4, and 5, respectively, and indicated on Figure 1, with a pair of ports 61, 62, in the first plane, shown in Figure 2, admitting to the respective compartments 51 and 52 at the left of the vanes 15, but at opposite sides of the fixed abutments 28; with the pair of ports 63 and 64, leading to the respective compartments 51 and 52, but now, as shown in Figure 3, at the right of the vanes 15; with the pair of ports 65 and 66, as shown in Figure 4, which admit to the same compartments 51 and 52 as are shown in Figure 3 (those to the right of the vanes 15); and finally, as seen in Figure 5, the pair of ports 67 and 68, admitting now to the respective compartments 51 and 52, which are the same as those shown in Figure 2, namely, those at the left of the vanes 15.

The rotatable element 30, oscillatable under the influence of the thermostat 85, is provided with a longitudinal vent passage 31, somewhat offset from its axis, and communicating directly with the relief conduit 84. The element 30 has also longitudinal passages 32 and 37 which are in communication with the chamber 27 and with the pressure fluid therein, so that the passages 32 and 37 may be considered pressure passages, as the passage 31 is a vent or relief passage. The element 30 has also certain transverse cuts or notches, which for convenience may be termed ports, at four different transverse planes, indicated by the planes of the Figures 2, 3, 4 and 5, respectively, which afford communication with one or the other of the ports 31, 32, and 37, and between the latter and the ports 61 to 68 in the hub 14. Thus as seen in Figure 2, a shallow transverse notch 33 is in direct communication with the pressure passage 37, and upon rotation of the element 30 in one direction or the other places the pressure passage 37 in communication, either through the port 61 with a chamber 51, or through the port 62 with a chamber 52, as may be seen in Figure 2.

In the next plane, beyond the end of the passage 37, a shallow notch 34, on the opposite side of the element 30, communicates with the pressure passage 32, and upon oscillation of the element 30 may place the pressure passage 32, through the port 63, in communication with a chamber 51, or, through the port 64, in communication with a chamber 52.

In the next plane, shown in Figure 4, a deep notch 35, which lies beyond the end of the pressure passage 32, and which communicates only with the vent passage 31, may by oscillation of the element 30 place the vent passage 31 in communication, either through the port 65 with a chamber 51, or through the port 66 in communication with a chamber 52. Again in the next plane illustrated in Figure 5, a deep notch 36, which communicates only with the vent passage 31, may by oscillation of the element 30 place the vent passage 31, by way of port 67, in communication with a chamber 51, or, by way of the port 68, in communication with a chamber 52.

If we assume parts to be in equilibrium, in the positions shown in Figures 1 and 6 inclusive, and if the thermostatic element 85, becoming unbalanced by a change of temperature, tends to move the element 30, as viewed in Figures 2 to 5 inclusive, in a counterclockwise direction, the following actions take place: Referring first to Figure 2, this counterclockwise oscillation of the element 30 places the pressure passage 37, through the notch 33 and the port 61, in communication with the lower left-hand chamber 51, producing a tendency to move the vane or diaphragm 15 also counterclockwise. Referring to Figure 3, like counterclockwise movement of the element 30 places the pressure passage 32 in communication, through 34 and 63, with the upper right hand chamber 51, likewise tending to move the vanes 15 counterclockwise. Referring to Figure 4, the same counterclockwise movement of the element 30 places the vent passage 31, through the notch 35 and the port 66, in communication with the lower right-hand chamber 52, removing resistance in this chamber to the follow-up or counterclockwise movement of the vane 15, and the same action occurs under like conditions in Figure 5, the upper left-hand chamber 52 being placed in communication with the vent passage 31 through the port 68. Accordingly, upon initial counterclockwise movement of the element 30 the chambers are connected with pressure or to a vent in such manner that the vane 15 immediately commences to move counterclockwise, under the influence of the pressure differential which has disturbed the equilibrium, and the various ports 61 to 68 inclusive, moving with the vanes 15, tend to follow up and again to be closed off as the element 30 assumes a new or rotated position. Thus results a new position of equilibrium.

In similar fashion it could be shown that if the element 30 is initially rotated clockwise from any given position short of its limit, corresponding clockwise movement of the vanes 15 will result until they again reach a new position of equilibrium.

This movement of the vanes 15, under the influence of the pressure fluid and the pressure differential, created as indicated above, is communicated to the controlled elements 7 and 70 by an arm 75 secured upon the end of 14 to rotate with the latter, and connected by a link 76 to the arm 72. Thus the element 30 is movable under the control of the controlling element 85, and the vanes 15, which constitute the diaphragm or piston of the servo control, is connected to the controlled elements 7 and 70 for conjoint movement.

The servo device may thus operate under automatic control, and is peculiarly susceptible to such automatic control, but it may be operated under manual control as well, as will be self-evident. It constitutes a sensitive device adjustable to any one of an infinite number of positions of equilibrium within its range of movement, to accomplish movement of a controlled element under the influence of movement of a weak controlling element.

What I claim as my invention is:

1. A servo device for interposition between a controlled element and a controlling element, comprising a casing defining a closed chamber and a chambered supply passage leading thereto, a diaphragm movable within and dividing the chamber into two compartments, means operatively connecting the controlled element to the diaphragm, for conjoint movement, two cooperating valve members controlling the supply of a pressure fluid to one compartment and the venting of the other, a spirally wound thermostatic controlling element within the chamber of the supply passage, one of said valve members being operatively connected for movement by and in accordance with movement of the diaphragm and the connected controlled element, and the other of said valve members being operatively connected for movement by and in accordance with movement of the thermostatic controlling element, the two valve members cooperating when relatively moved to move the controlled element to and to maintain it in any one of an infinite number of positions of equilibrium, depending upon the setting of the controlling element.

2. An oscillatable servo-motor comprising a casing, every section of which, normal to its axis, is a circle, said casing being diametrically partitioned by fixed abutments, to define left-hand and right-hand chambers, a hollow oscillatable hub axially disposed, and having two diametrically disposed vanes in the opposite chambers, dividing each chamber into upper and lower compartments, a valve stem received within and oscillatable relative to the bore of the hub, said hub having four pressure ports, each communicating with one of the four compartments, and grouped in axially spaced pairs, and having also four vent ports, similarly communicating and grouped, but spaced axially from the pressure ports, and all disposed closely adjacent the oscillatable vanes, said valve stem having two axially spaced pressure ports each disposed for communication, by relative oscillation of the valve and hub, with one or the other pressure port of its corresponding pair of the hub pressure ports, and two axially spaced vent ports similarly disposed and arranged each for communication with one or the other of its corresponding pair of the hub vent ports, the several ports being so disposed and arranged that one such oscillatory member follows up movement of the other, and control means operable to initiate oscillatory movement of one such member.

3. An oscillatable servo-motor as in claim 2, characterized in that the oscillatable valve stem has two separate longitudinal pressure passages connected to a pressure fluid source, and connected, one to the stem's pressure ports for the left-hand chamber, and the other to the stem's pressure ports for the right-hand chamber, and in that the stem has a single longitudinal vent passage connected to all the stem's vent ports.

4. An oscillatable servo-motor as in claim 2, characterized in that the oscillatable valve stem has two separate longitudinal pressure passages, one at the left-hand side of its axis, extending only so far as the first or left-hand pair of pressure ports, and the other at the right-hand side, extending only so far as the adjoining second or right-hand pair of pressure ports, the stem having also a single longitudinal vent passage extending past the pressure ports and to the last pair of vent ports, the stem's pressure ports being formed as shallow notches extending inward only sufficiently to intersect the corresponding pressure passage, and the stem's vent ports being also formed as notches deep enough to intersect the single vent passage.

NATHAN C. PRICE.